(12) United States Patent
Neyra (10) Patent No.: US 12,191,769 B2
(45) Date of Patent: Jan. 7, 2025

(54) CURRENT MODE CONTROLLER AND CORRESPONDING METHOD OF OPERATION

(71) Applicant: Infineon Technologies Austria AG, Villach (AT)

(72) Inventor: Percy Neyra, Portland, OR (US)

(73) Assignee: Infineon Technologies Austria AG, Villach (AT)

( * ) Notice: Subject to any disclaimer, the term of this patent is extended or adjusted under 35 U.S.C. 154(b) by 266 days.

(21) Appl. No.: 17/961,966

(22) Filed: Oct. 7, 2022

(65) Prior Publication Data

US 2024/0128869 A1 Apr. 18, 2024

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC ..... H02M 1/0009; H02M 3/156; H02M 3/158
See application file for complete search history.

(56) References Cited

U.S. PATENT DOCUMENTS

| | | | |
|---|---|---|---|
| 2005/0035748 A1 | 2/2005 | Inn | |
| 2016/0065062 A1 | 3/2016 | Teh et al. | |
| 2017/0085168 A1 | 3/2017 | Laur et al. | |
| 2019/0252969 A1* | 8/2019 | Li | H02M 3/158 |
| 2019/0305676 A1 | 10/2019 | Dietrich et al. | |
| 2022/0345040 A1* | 10/2022 | Couleur | H02M 1/0009 |
| 2022/0407417 A1* | 12/2022 | Flaibani | H02M 3/158 |
| 2023/0299674 A1* | 9/2023 | Liu | H02M 3/06 323/271 |
| 2024/0030799 A1* | 1/2024 | Yang | H02M 3/156 |

OTHER PUBLICATIONS

Lu, Liangji, et al., "Current Programmed Mode Control of Multi-Level Flying Capacitor Converter Near Zero-Ripple Current Region", 2019 IEEE Applied Power Electronics Conference and Exposition (APEC), Mar. 17, 2019, pp. 1-7.

* cited by examiner

*Primary Examiner* — Gary L Laxton
(74) *Attorney, Agent, or Firm* — Murphy, Bilak & Homiller, PLLC (57) ABSTRACT

A current mode controller includes: an error amplifier configured to generate an error signal that corresponds to the difference between a reference voltage and a voltage indicative of an output voltage of a power converter; a first current measurement circuit configured to measure current flowing in a high-side switch device of the power converter; a second current measurement circuit configured to measure current flowing in a low-side switch device of the power converter; a comparator configured to indicate when a voltage derived by the first current measurement circuit exceeds the error signal in a peak current control mode, and when a voltage derived by the second current measurement circuit drops below the error signal in a valley current control mode; and circuitry configured to configure the comparator in either the peak current control mode or the valley current control mode for each switching cycle of the power converter.

20 Claims, 8 Drawing Sheets

CURRENT MODE CONTROLLER AND CORRESPONDING METHOD OF OPERATION

BACKGROUND

Current mode switching power controllers must sense the current flowing in one of the power converter switches to provide stable control of the output voltage (Vout). The current sensing must take place while the power switch is conducting. The duty cycle or time the switch is conducting can be very short, as the duty cycle is related to the voltage level controlled at the output of the converter and the input voltage (Vin) of the converter. Very short duty cycles, e.g., less than 100 ns (nanoseconds) can lead to very stringent specifications in terms of bandwidth and settling time for the current sensing circuit. In the case of buck peak current mode controllers, and when the voltage conversion ratio Vout/Vin is small or when Vin is large and Vout is small voltage, the duty cycle D=Vout/Vin is very small and the time available to sense the current is very short. One solution in this case is to operate the controller in valley current mode or the opposite phase of the converter. However, most controllers only operate under either peak or valley current mode and not under both. Furthermore, switching between peak and valley current modes results in discontinuities in the system which manifest as large disturbances at the output of the converter. In addition, switching noise exacerbates the challenge of sensing current at short duty cycles. Therefore, monolithic switching converters operating at medium to high power are most challenged when operating in current mode at low duty cycles.

Thus, there is a need for an improved current mode controller.

SUMMARY

According to an embodiment of a current mode controller, the current mode controller comprises: an error amplifier configured to generate an error signal that corresponds to the difference between a reference voltage and a voltage indicative of an output voltage of a power converter; a first current measurement circuit configured to measure current flowing in a high-side switch device of the power converter; a second current measurement circuit configured to measure current flowing in a low-side switch device of the power converter; a comparator configured to indicate when a voltage derived by the first current measurement circuit exceeds the error signal in a peak current control mode, and when a voltage derived by the second current measurement circuit drops below the error signal in a valley current control mode; and circuitry configured to configure the comparator in either the peak current control mode or the valley current control mode for each switching cycle of the power converter.

According to an embodiment of a method of operating a current mode controller, the method comprises: generating an error signal that corresponds to the difference between a reference voltage and a voltage indicative of an output voltage of a power converter; measuring, via a first current measurement circuit, current flowing in a high-side switch device of the power converter; measuring, via a second current measurement circuit, current flowing in a low-side switch device of the power converter; indicating, via a comparator, when a voltage derived by the first current measurement circuit exceeds the error signal in a peak current control mode, and when a voltage derived by the second current measurement circuit drops below the error signal in a valley current control mode; and configuring the comparator in either the peak current control mode or the valley current control mode for each switching cycle of the power converter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a current mode controller and corresponding control methods which enable the current mode controller to operate in peak current mode control or valley current mode control and seamlessly transition between these two modes without restarting or resetting the power converter and with minimal disturbance at the output voltage of the converter. The control methods described herein seamlessly transition from one current mode control to the other current mode control by maintaining the same or nearly the same average current in the inductor of the power converter and may derive timing information for implementing the seamless transition from a single system clock. The same switching frequency may be maintained when transitioning from one current mode control to the other current mode control, with the transition being seamless to the end user.

Described next, with reference to the figures, are exemplary embodiments of the current mode controller and corresponding control methods.

Figure 1:
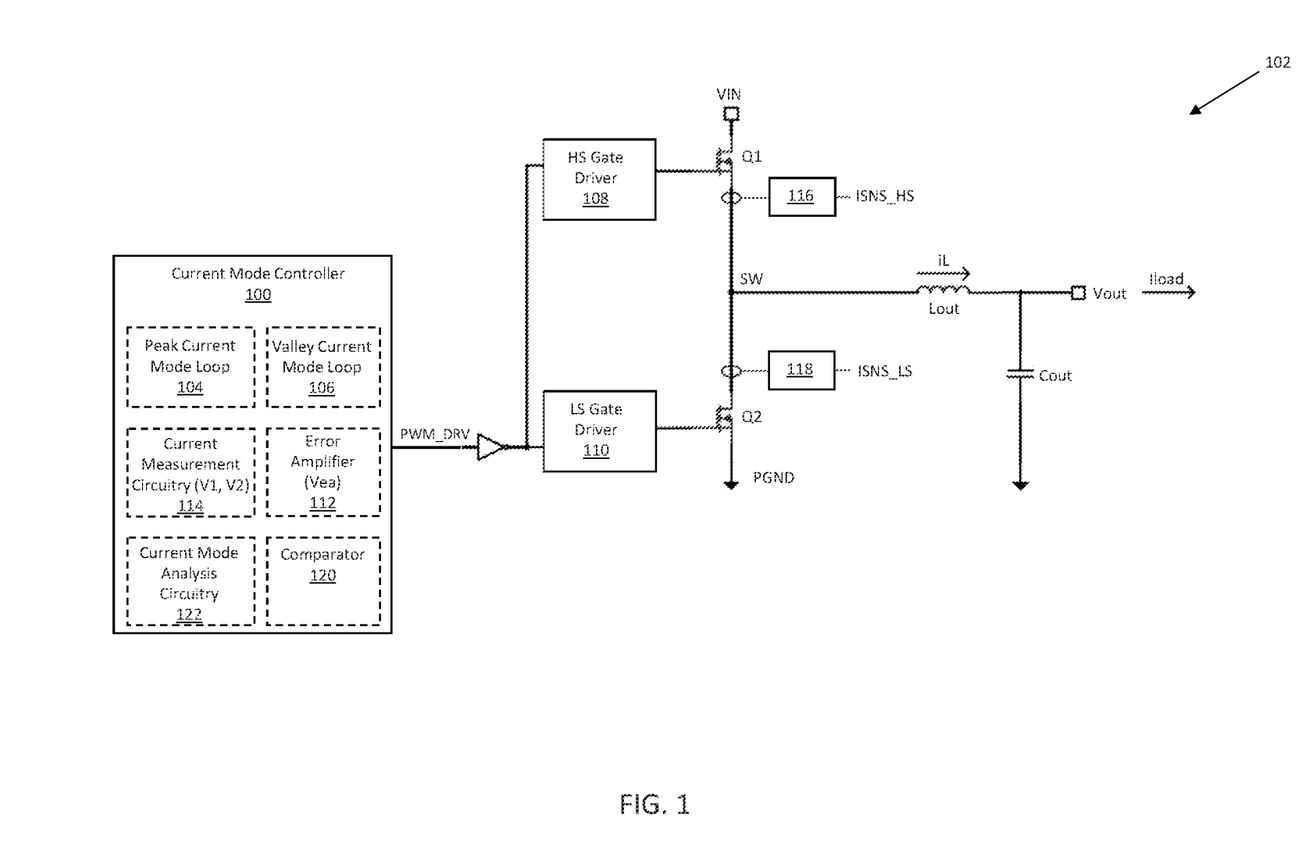
FIG. 1 illustrates a schematic diagram of an embodiment of a current mode controller for a power converter.

FIG. 1 illustrates an embodiment of a current mode controller 100 for a power converter 102. The current mode controller 100 includes a peak current mode loop 104 for implementing peak current mode control and a valley current mode loop 106 for implementing valley current mode control. In peak current mode control, the peak current mode loop 104 compares the current in a power switch device Q1, Q2 of the converter 102 to a peak current limit value during the switch on-time. The peak current mode loop 104 terminates the on-time when the current reaches the peak current limit value at which point the off-time begins. Typically, the high-side (HS) current in power switch device Q1 is sensed during the first part of the switching cycle in peak current mode control. However, peak current mode control instead may be implemented using low-side (LS) current sensed information.

In valley current mode control, the valley current mode loop 106 monitors switch current during the off-time. With the current decreasing during the off-time, the valley current mode loop 106 compares the switch current to a valley current limit value. The valley current mode loop 106 terminates the off-time when the current drops to the valley current limit value at which point the on-time begins. Typically, the low-side (LS) current in power switch device Q2 is sensed during the second part of the switching cycle in valley current mode control. However, valley current mode control instead may be implemented using high-side (HS) current sensed information.

In FIG. 1, the power converter 102 is illustrated as a buck converter with a high-side (HS) power switch device Q1 and a low-side (LS) power switch device Q2 coupled in series to form a switch node (SW) output. The high-side power switch device Q1 is electrically coupled between an input voltage Vin and the switch node SW. The low-side power switch device Q2 is electrically coupled between the switch node SW and a ground terminal PGND of the buck converter. The power switch devices Q1, Q2 are illustrated as NMOS devices in FIG. 1. More generally, the power switch devices Q1, Q2 may be any type of power transistor device designed for use in a power converter, e.g., power MOSFETs (metal-oxide-semiconductor field-effect transistors), IGBTs (insulated gate bipolar transistors), HEMTs (high electron mobility transistors), etc.

The switch node SW is electrically connected to a load (not shown) through an output inductor Lout of the power converter 102. Current iL through the output inductor Lout charges an output capacitor Cout which stabilizes the output voltage Vout. The buck converter regulates the output voltage Vout based on a reference voltage Vref, in response to changes in the load current (load.

The current mode controller 100 generates a logic signal PWM_DRV for controlling the power switch devices Q1, Q2 of the buck converter. Respective gate drivers 108, 110 convert the logic signal PWM_DRV to a sufficiently strong signal for driving the gate of the corresponding power switch device Q1, Q2. The high-side (HS) gate drover 108 may include level shifter circuitry. A buck converter is just one example of the power converter 102. In other examples, the power converter 102 may be a boost converter, buck-boost converter, etc.

The current mode controller 100 for the power converter 102 also includes an error amplifier 112 for generating an error signal Vea. The error signal Vea corresponds to the difference between the reference voltage Vref and a voltage VFB indicative of the output voltage Vout of the power converter 102. The voltage VFB indicative of the output voltage Vout of the power converter 102 may be Vout or a scaled version of Vout, e.g., in case a voltage divider is used.

Current measurement circuitry 114 included in the current mode controller 100 includes a first current measurement circuit for measuring the current flowing in the high-side switch device Q1 of the power converter 102 and a second current measurement circuit for measuring the current flowing in the low-side switch device Q2 of the power converter 102. A first current sensor 116 may be used to sense the current in the high-side switch device Q1 when the high-side switch device Q1 is on. A second current sensor 118 may be used to sense the current in the low-side switch device Q2 when the low-side switch device Q2 is on. Any type of current sensors may be used such as, e.g., current sensing resistors, hall sensors, etc. The sensed switch device currents ISNS_HS, ISNS_LS are provided to the current measurement circuitry 114 of the current mode controller 100.

A comparator 120 included in the current mode controller 100 indicates when a voltage V1 derived by the first current measurement circuit exceeds the error signal Vea in peak current control mode. The comparator 120 also indicates when a voltage V2 derived by the second current measurement circuit drops below the error signal Vea in valley current control mode.

Circuitry 122 included in the current mode controller 100 configures the comparator 120 in either the peak current control mode or the valley current control mode for each switching cycle of the power converter 102.

Figure 2:
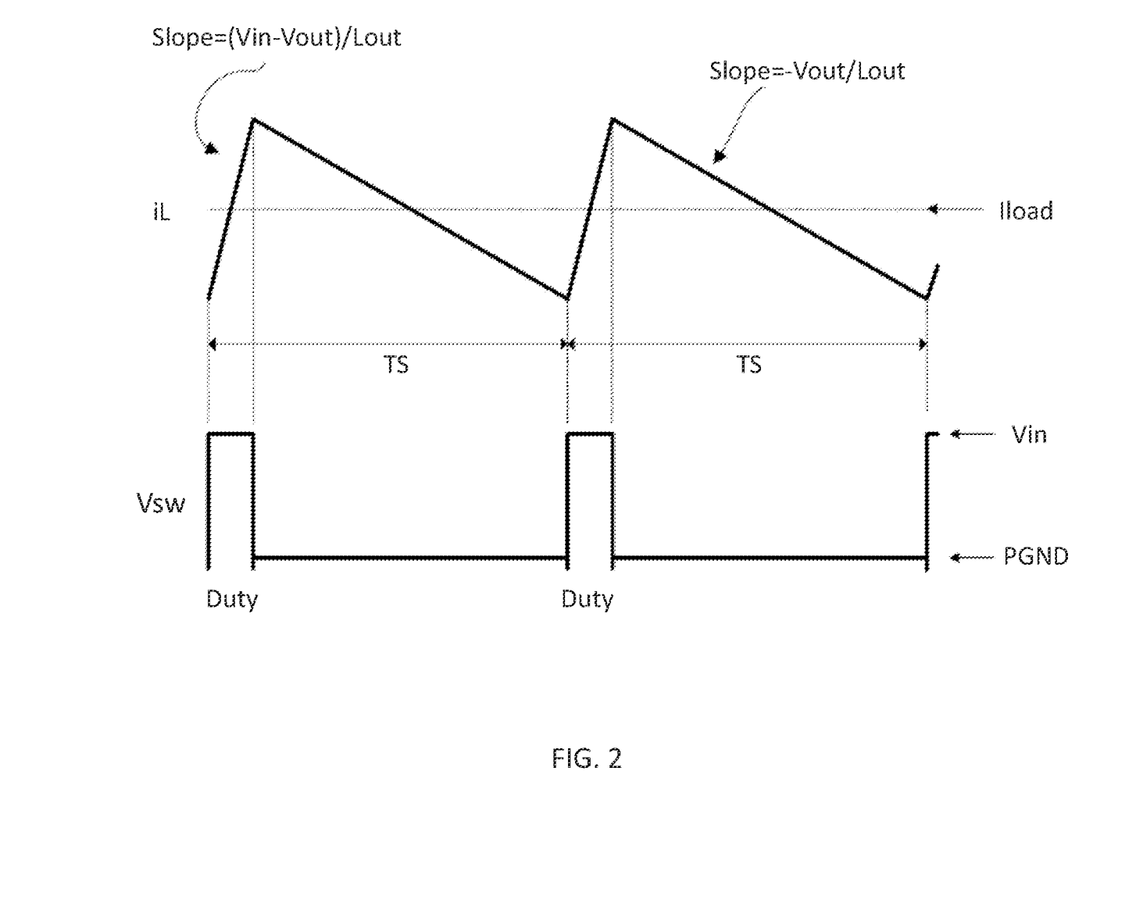
FIG. 2 illustrates a waveform diagram of the inductor current of the power converter and the voltage at a switch node of the power converter during each switching cycle or period.

FIG. 2 shows the inductor current iL of the power converter 102 and the voltage Vsw at the switch node SW during each switching cycle or period Ts. The high-side power switch device Q1 is on and the low-side power switch device Q2 is off during a first part of each switching cycle/period Ts. The output inductor Lout is electrically connected to the input voltage Vin when the high-side power switch device Q1 is on, causing the inductor current iL to rise with a slope of:

$$(Vin-Vout)/Lout \quad (1)$$

The high-side power switch device Q1 is off and the low-side power switch device Q2 is on during a second (later) part of each switching cycle/period Ts. The output inductor Lout is electrically connected to the converter ground terminal PGDN when the low-side power switch device Q2 is on, causing the inductor current iL to drop with a slope of:

$$-Vout/Lout \quad (2)$$

The duty cycle determines how long the high-side power switch device Q1 is on and therefore how high the inductor current iL rises each switching cycle/period Ts.

The first current sensor 116 may not have sufficient bandwidth and/or settling time for sensing the current in the high-side switch device Q1 when the duty cycle drops below a predetermined threshold, e.g., 15% or less. In this case, the circuitry 122 included in the current mode controller 100 may reconfigure the comparator 120 from the peak current control mode to the valley current control mode without restarting or resetting the power converter, and with minimal disturbance at the output voltage Vout of the power converter 102. When the duty cycle increases above the predetermined threshold, the circuitry 122 may reconfigure the comparator 120 back to the peak current control mode again without restarting or resetting the power converter, and with minimal disturbance at the output voltage Vout of the power converter 102.

Figure 3A:
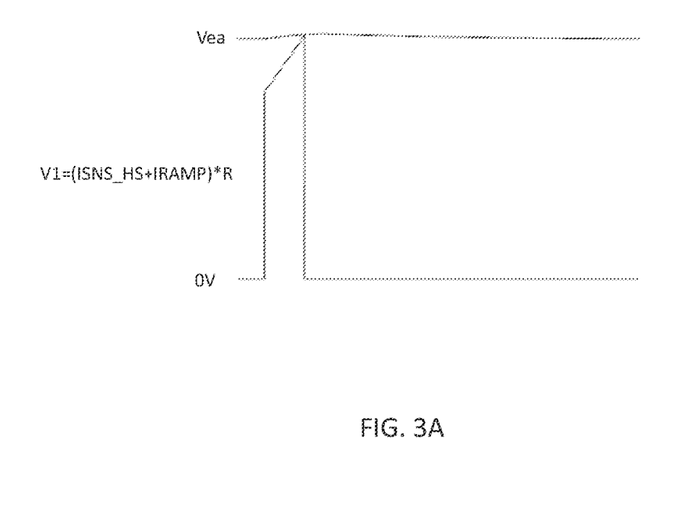
FIG. 3A illustrates a waveform diagram of an error signal generated by an error amplifier included in the current mode controller when a peak current mode loop of the controller implements peak current mode control.

FIG. 3A illustrates the error signal Vea generated by the error amplifier 112 included in the current mode controller 100 for the power converter 102, when the peak current mode loop 104 of the controller 100 implements peak current mode control. The voltage V1 derived by the first current measurement circuit of the current measurement circuitry 114 included in the current mode controller 100 may be given by:

$$V1=(ISNS\_HS+IRAMP)*R \quad (3)$$

where ISNS HS is the high-side switch device current measured by the first current sensor 116, IRAMP is a ramp current internally generated by the current mode controller 100, and R is a resistance value.

In peak current control mode, the current mode controller 100 turns off the high-side switch device Q1 when V1 exceeds the error signal Vea.

Figure 3B:
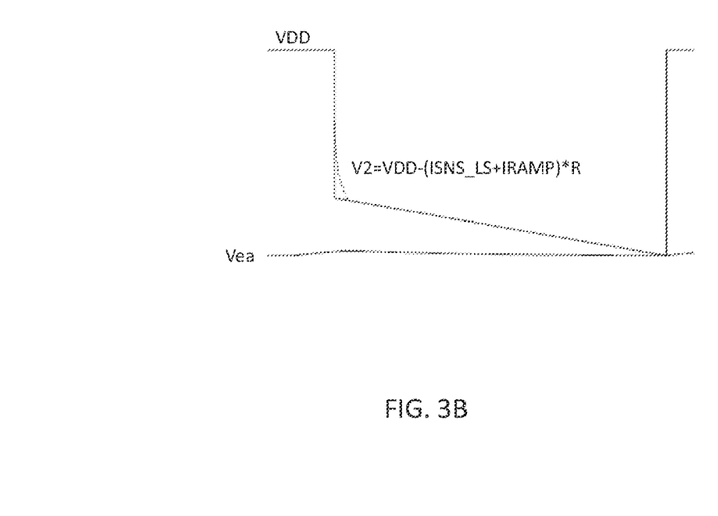
FIG. 3B illustrates a waveform diagram of the error signal generated by the error amplifier when a valley current mode loop of the current mode controller implements valley current mode control.

FIG. 3B illustrates the error signal Vea generated by the error amplifier 112 when the valley current mode loop 106 of the current mode controller 106 implements valley current mode control. The voltage V2 derived by the second current measurement circuit of the current measurement circuitry 114 included in the current mode controller 100 may be given by:

$$V2=VDD-(ISNS\_LS+IRAMP)*R \quad (4)$$

where ISNS LS is the low-side switch device current measured by the second current sensor 118 and VDD is a supply voltage.

In valley current control mode, the current mode controller 100 turns off the low-side switch device Q1 when V2 drops below the error signal Vea.

Figure 4:
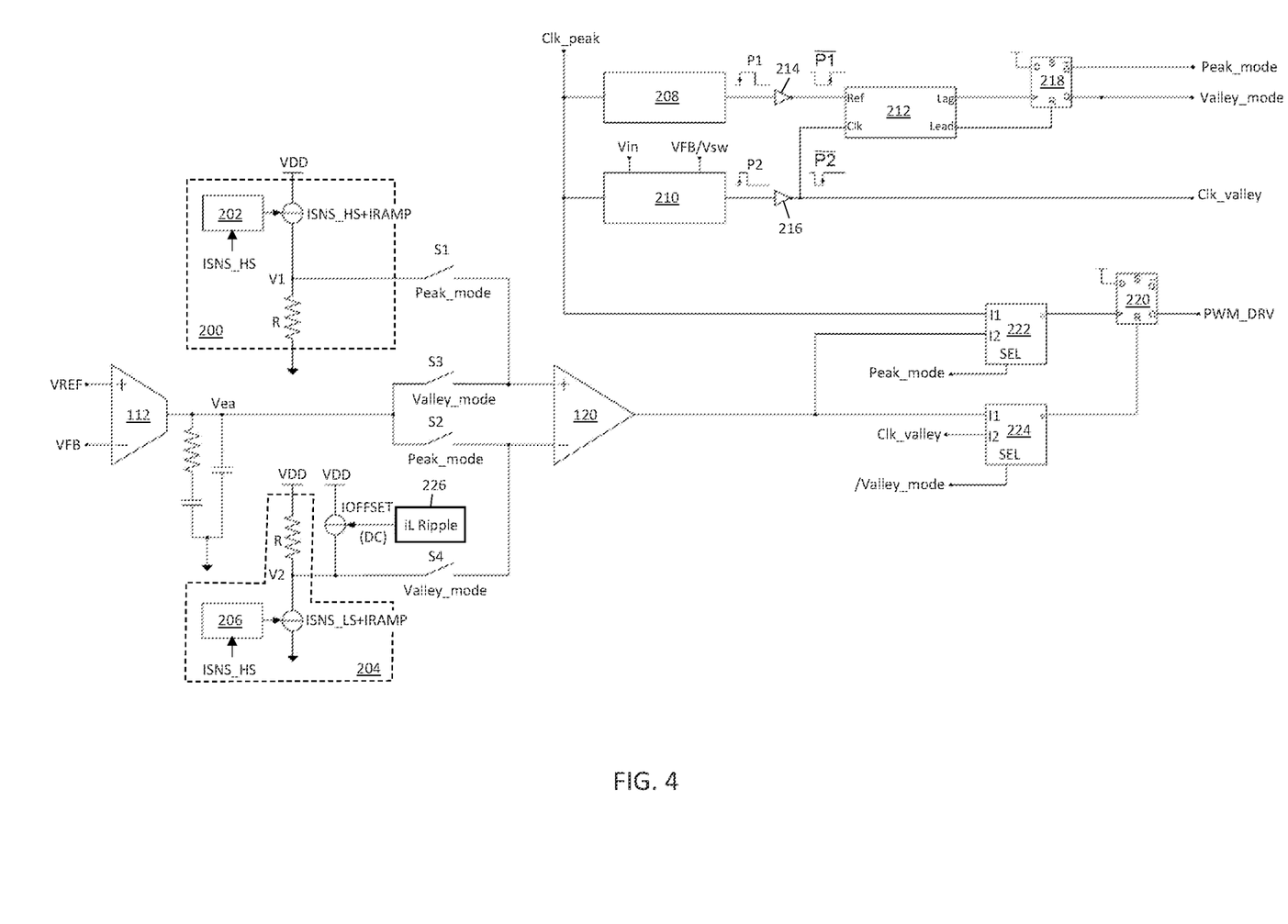
FIG. 4 illustrates a circuit schematic of circuitry included in the current mode controller and that configures a comparator in either the peak current control mode or the valley current control mode for each switching cycle of the power converter, according to an embodiment.

FIG. 4 illustrates an embodiment of the circuitry 122 that configures the comparator 120 in either the peak current control mode or the valley current control mode for each switching cycle of the power converter 102. According to this embodiment, the circuitry 122 includes a first switch S1 that connects the voltage V1 derived by the first current measurement circuit 200 of the current measurement circuitry 114 to a positive input '+' of the comparator 120 in the peak current control mode. The first current measurement circuit 200 may derive the voltage V1 in accordance with equation (3), e.g., where a current ramp generator 202 may be used to generate the ramp current IRAMP in the peak current control mode. A second switch S2 of the circuitry 122 connects the error signal Vea generated by the error amplifier 112 to a negative input '−' of the comparator 120 in the peak current control mode. With this first configuration of the comparator inputs, the comparator 120 performs the error signal comparison shown in FIG. 3A.

The circuitry 122 also includes a third switch S3 that connects the error signal Vea to the positive input '+' of the comparator 120 in the valley current control mode. A fourth switch S4 of the circuitry 122 connects the voltage V2 derived by the second current measurement circuit 204 of the current measurement circuitry 114 to the negative input '−' of the comparator 120 in the valley current control mode. The second current measurement circuit 204 may derive the voltage V2 in accordance with equation (4), e.g., where a current ramp generator 206 may be used to generate the ramp current IRAMP in the valley current control mode. With this second configuration of the comparator inputs, the comparator 120 performs the error signal comparison shown in FIG. 3B.

According to the embodiment illustrated in FIG. 4, the circuitry 122 that configures the comparator 120 in either the peak current control mode or the valley current control mode also includes a first pulse generator 208, a second pulse generator 210, and a phase detector 212. The first pulse generator 208 generates a first periodic pulse P1 synched to a system clock 'Clk_peak' generated by the current mode controller 100 and having a predetermined width that is fixed or constant. Accordingly, the first pulse generator 208 may be considered as a constant on-time generator. The second pulse generator 210 generates a second periodic pulse P2 synched to the system clock Clk_peak and having a variable width that corresponds to the duty cycle 'D' of the power converter 102. Accordingly, the second pulse generator 210 may be considered as a variable on-time generator.

In one embodiment, the second pulse generator 210 determines the variable width of the second periodic pulse P2 based on the difference between and the input voltage Vin of the power converter 102 and the voltage VFB indicative of the output voltage Vout of the power converter 102. In another embodiment, the second pulse generator 210 determines the variable width of the second periodic pulse P2 based on the input voltage Vin of the power converter 102 and the voltage Vsw at the switch node VSW between the high-side switch device Q1 and the low-side switch device Q2 of the power converter 102. In either case, the second periodic pulse P2 tracks the duty cycle of power converter 102.

The phase detector 212 determines whether a rising or falling edge of the second periodic pulse P2 lags or leads the corresponding rising or falling edge of the first periodic pulse P1. A first inverter 214 may invert the first periodic pulse P1 and provide the inverted first pulse $\overline{P1}$ as a reference input 'Ref' to the phase detector 212. A second inverter 216 may invert the second periodic pulse P2 and provide the inverted second pulse $\overline{P2}$ as a clock input 'Clk' to the phase detector 212.

In FIG. 4, the circuitry 122 that configures the comparator 120 in either the peak current control mode or the valley current control mode also includes a first latch 218 such as a synchronous SR latch for indicating either the peak current control mode 'Peak_mode' or the valley current control mode 'Valley_mode' based on the phase detector output. The first latch 218 indicates the peak current control mode 'Peak_mode' if a first output 'Lag' of the phase detector 212 indicates the rising or falling edge of the second periodic pulse P2 lags the same rising or falling edge of the first periodic pulse P1. The first latch 218 indicates the valley current control mode 'Valley_mode' if a second output 'Lead' of the phase detector 216 indicates the rising or falling edge of the second periodic pulse P2 leads the same rising or falling edge of the first periodic pulse P1.

The peak current control mode signal Peak_mode output by the first latch 218 closes the first and second switches S1, S2 such that the comparator 120 performs the error signal comparison shown in FIG. 3A in the peak current control mode. The valley current control mode signal Valley_mode output by the first latch 218 closes the third and fourth switches S3, S4 such that the comparator 120 performs the error signal comparison shown in FIG. 3B in the valley current control mode.

In FIG. 4, the circuitry 122 that configures the comparator 120 in either the peak current control mode or the valley current control mode also includes a second latch 220 such as a synchronous SR latch, a first multiplexor 222, and a second multiplexor 224. The second latch 220 outputs the gate drive signal PWM_DRV for the high-side switch device Q1 of the power converter 102. The first multiplexor 222 has the system clock Clk_peak as a first input 'I1', the output of the comparator 120 as a second input 'I2', a select line 'SEL' controlled by the peak current control mode indication 'Peak_mode' output by the first latch 218, and an output 'D' that forms a clock input of the second latch 220. The second multiplexor 224 has the output of the comparator 120 as a first input 'I1', the second periodic pulse P2 as a second input 'I2', a select line 'SEL' determined by the valley current control mode indication 'Valley mode' output by the first latch 218, and an output 'D' that forms a reset input 'R' of the second latch 220.

During operation, the output 'D' of the first multiplexor 222 drives the clock input of the second latch 220 and the output 'D' of the second multiplexor 224 drives the reset input 'R' of the second latch 220. In the peak current control mode, the first multiplexor 222 clocks the second latch 220 based on the system clock Clk_peak and the second multiplexor 224 resets the second latch 220 based on the output of the comparator 120. In the valley current control mode, the first multiplexor 222 clocks the second latch 220 based on the output of the comparator 120 and the second multiplexor 224 resets the second latch 220 based on a clock signal 'Clk_valley' derived from the second periodic pulse P2 which tracks or corresponds to the duty cycle D of the power converter 102. For example, the clock signal Clk_valley may be the inverted second periodic pulse $\overline{P2}$.

In FIG. 4, the circuitry 122 that configures the comparator 120 in either the peak current control mode or the valley current control mode also includes a voltage offset circuit 226 that injects a DC voltage offset 'IOFFSET' into the voltage V1 derived by the first current measurement circuit 200 and/or into the voltage V2 derived by the second current measurement circuit 204. The voltage offset IOFFSET corresponds to the output current ripple 'iL Ripple' of the power converter 102. The voltage offset circuit 226 is shown injecting the DC voltage offset IOFFSET into the voltage V2 derived by the second current measurement circuit 204 in FIG. 4. However, the voltage offset circuit 226 may instead inject the DC voltage offset IOFFSET into the voltage V1 derived by the first current measurement circuit 200 or into the voltages V1, V2 derived by both current measurement circuits 200, 204.

Figure 5A:
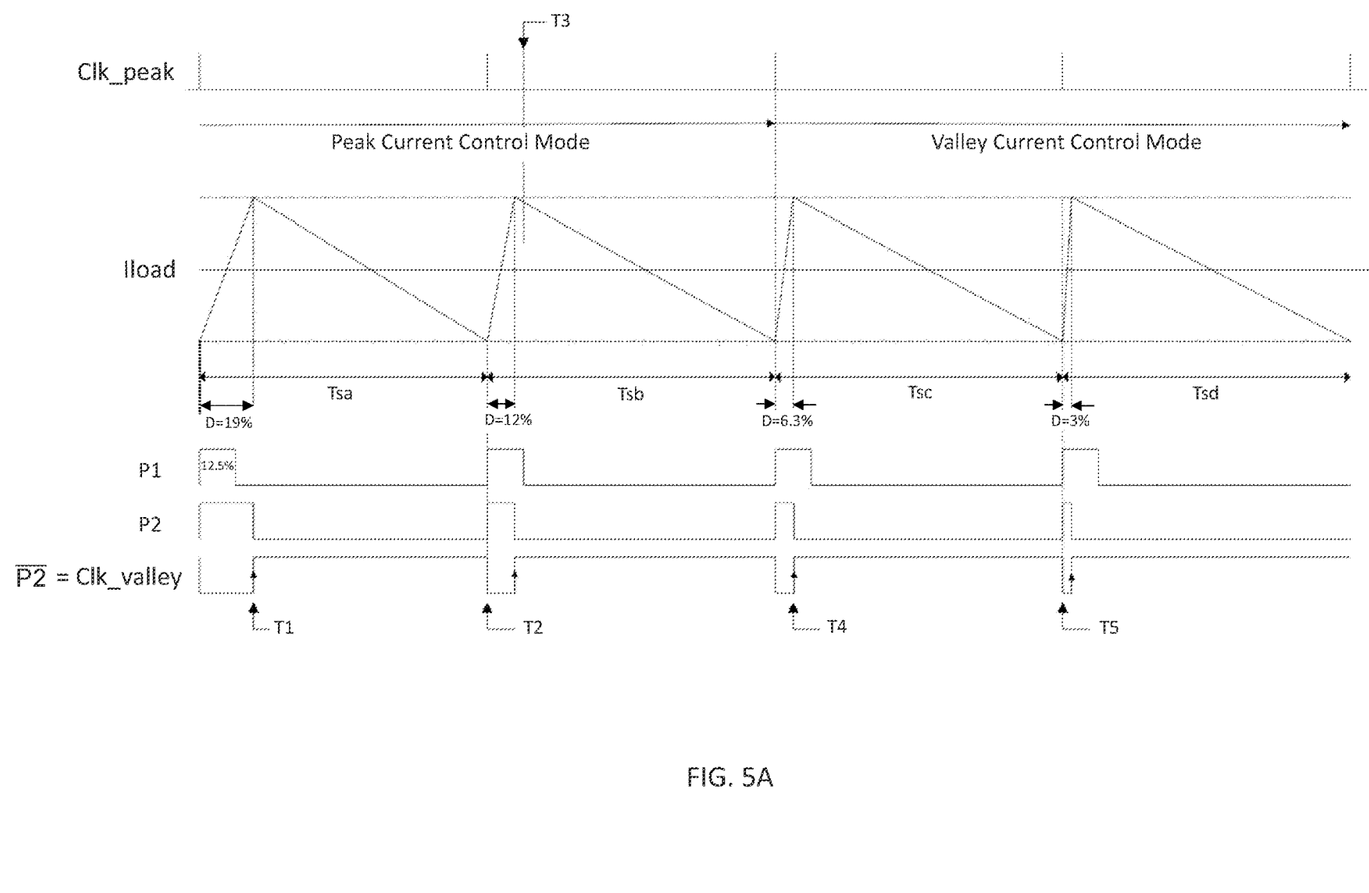
FIG. 5A illustrates a waveform diagram of a transition from the peak current control mode to the valley current control mode, as implemented by the controller embodiment illustrated in FIG. 4.

FIG. 5A illustrates a transition from the peak current control mode to the valley current control mode, as implemented by the controller embodiment illustrated in FIG. 4.

The periodic pulse P1 generated by the first pulse generator 208 has a fixed or constant width. In FIG. 5A, 12.5% is given as an example of the constant pulse width for P1. This is just an example—the constant pulse width of P1 may be greater than or less than 12.5%. The current mode controller 100 operates in the peak current control mode if the duty cycle 'D' is greater than P1, where the variable-width periodic pulse P2 approximates the actual duty cycle D of the power converter 102. Otherwise, the current mode controller 100 operates in the valley current control mode.

For switching period Tsa in FIG. 5A, D=19% and P2>P1. Accordingly, the current mode controller 100 operates in the peak current control mode during switching period Tsa. In peak current control mode, the comparator 120 resets the second latch 220, which outputs the gate drive signal PWM_DRV for the high-side switch device Q1 of the power converter 102, via the second multiplexor 224 at time T1. In response, a falling edge of the second periodic pulse P2 with the variable width may occur simultaneous to the output of the comparator 120. The next switching period Tsb begins at time T2 in FIG. 5A. At time T2, the system clock Clk_peak generated by the current mode controller 100 clocks the second latch 220 via the first multiplexor 222.

The duty cycle D of the power converter 102 is less than P1 in switching period Tsb. Accordingly, P2<P1 which is detected by the phase detector 212 at time T3 in FIG. 5A. In response, the first latch 218 indicates that the current mode controller 100 should transition to the valley current control mode for the next switching period Tsc. The switches S1 through S4 in FIG. 4 are actuated accordingly.

In the valley current control mode, the second multiplexor 224 resets the second latch 220 based on the rising edge of the clock signal Clk_valley (e.g., $\overline{P2}$) derived from the second periodic pulse P2 and which occurs at time T4 in FIG. 5A. The first multiplexor 222 clocks the second latch 220 based on the output of the comparator 120 at time T5 in FIG. 5A which corresponds to the beginning of the next switching period Tsd. The duty cycle D of the power converter 102 remains below P1 for switching periods Tsc (e.g., D=6.3% for Tsc) and Tsd (e.g., D=3% for Tsc), so the current mode controller 100 remains in the valley current control mode until the phase detector 212 detects the condition P2>P1.

Figure 5B:
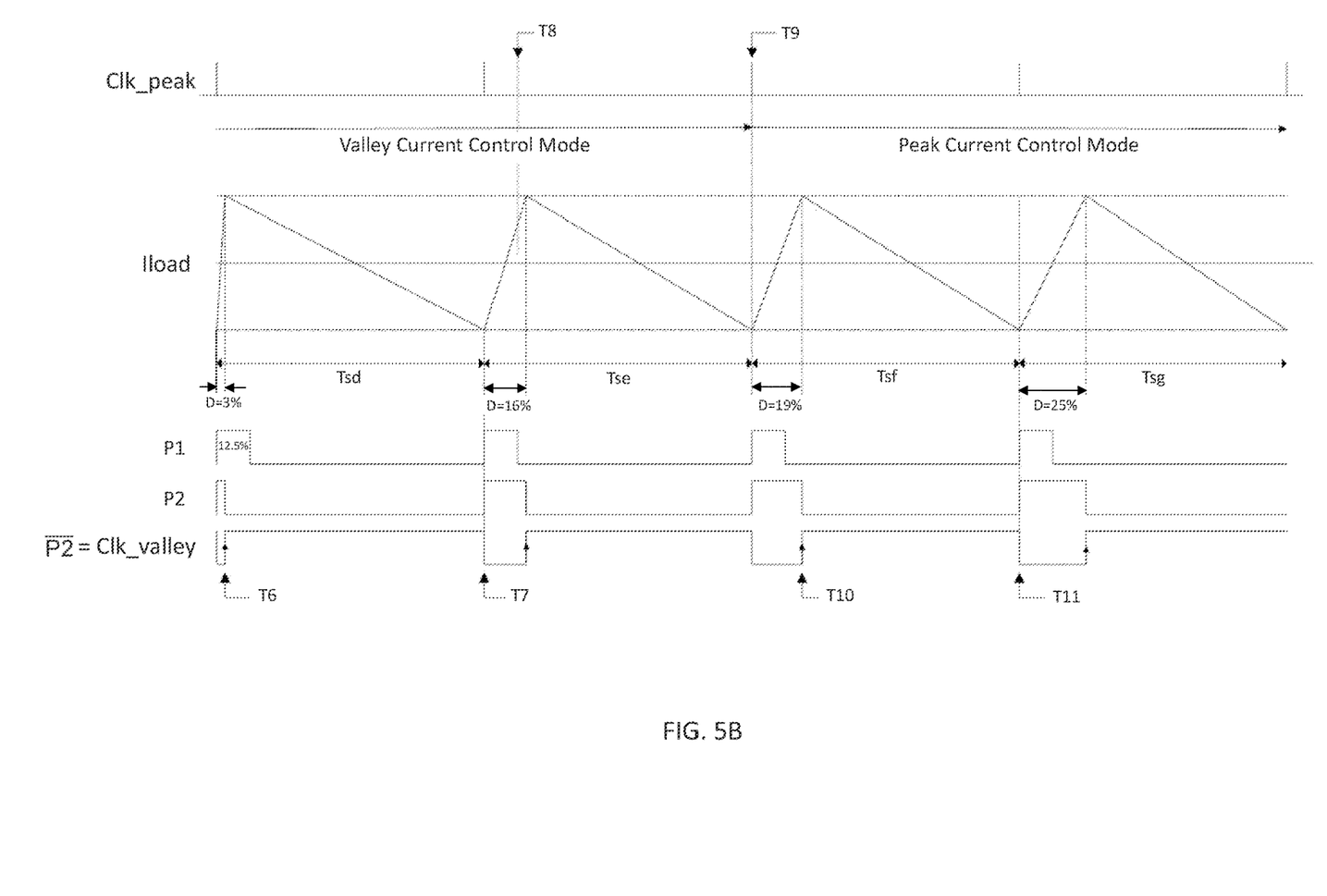
FIG. 5B illustrates a waveform diagram of a transition from the valley current control mode to the peak current control mode, as implemented by the controller embodiment illustrated in FIG. 4.

FIG. 5B illustrates a transition from the valley current control mode to the peak current control mode, as implemented by the controller embodiment illustrated in FIG. 4. The first switching period Tsd shown in FIG. 5B is the last switching period Tsd shown in FIG. 5A. Three successive switching periods Tse, Tsf, Tsg are also shown in FIG. 5B, each successive switching period Tse, Tsf, Tsg having an increasing duty cycle D. The first periodic pulse P1 is again illustrated as having a constant width of 12.5% in FIG. 5B merely as an example. As explained above, the constant pulse width of P1 may be greater or less than 12.5%.

The current mode controller 100 operates in the valley current control mode during the first switching period Tsd shown in FIG. 5B. In the valley current control, the second multiplexor 224 resets the second latch 220 based on the rising edge of the clock signal Clk_valley (e.g., $\overline{P2}$) derived from the second periodic pulse P2 which occurs at time T6 in FIG. 5B. The first multiplexor 222 clocks the second latch 220 based on the output of the comparator 120 at time T7 in FIG. 5B which corresponds to the beginning of the next switching period Tse.

The duty cycle D of the power converter 102 is greater than P1 for the next switching period Tse. Accordingly, P2<P1 which is detected by the phase detector 212 at time T8 in FIG. 5B. In response, the first latch 218 indicates that the current mode controller 100 should transition to the peak current control mode for the next switching period Tsf.

In the peak current control mode, the comparator 120 resets the second latch 220 via the second multiplexor 224 based on the rising edge of the output of the comparator 120 and which occurs at time T10 in FIG. 5B. The system clock Clk_peak generated by the current mode controller 100 clocks the second latch 220 via the first multiplexor 222 at time T11 in FIG. 5B which corresponds to the beginning of the next switching period Tsg.

The current mode controller embodiment illustrated in FIG. 4 uses the system clock Clk_peak for triggering when to transition between peak and valley current control modes, tracks the converter duty cycle D, and produces a phase shifted clock Clk valley for valley current control mode, which ensures smooth and seamless transitions to/from peak and valley current control modes. The current mode controller embodiment illustrated in FIG. 4 forces the power converter 102 to operate on a derived phase-shifted clock Clk_valley during the valley current control mode. The derived valley clock Clk_valley is phase shifted from the system clock Clk_peak by the duration of the on-time (i.e., duty cycle). This can create complications from a system-level perspective since there may be a preference for the converter switching clock to be in-phase with the system clock.

The embodiment described next in connection with FIGS. 6 and 7 eliminates the phase-shift. To eliminate the phase-shift, both the peak current mode loop 104 and the valley current mode loop 104 run on the same clock edge. However, without using the current mode controller embodiment illustrated in FIG. 4, the power converter 102 would be forced to do a hard or forced transition from peak-to-valley current control mode or vice-versa, which may lead to an inductor current iL that may already be ramping down when a transition occurs but may be forced to further ramp down, causing a change in the average inductor current as the transient pulse is forced to drop until the output of the error amplifier 112 recovers. This condition leads to a far too short off-time (LS-on) which consequently leads to a far too long on-time (HS-on) for the rest of the clock cycle, which in turn creates a large increase on the average inductor current and therefore a large overshoot at the converter output Vout. The embodiment illustrated in FIGS. 6 and 7 provides a way for using the same clock edge for both peak and valley current control modes and performs an immediate next-cycle transition without generating an overshoot or undershoot at the converter output Vout.

Figure 6:
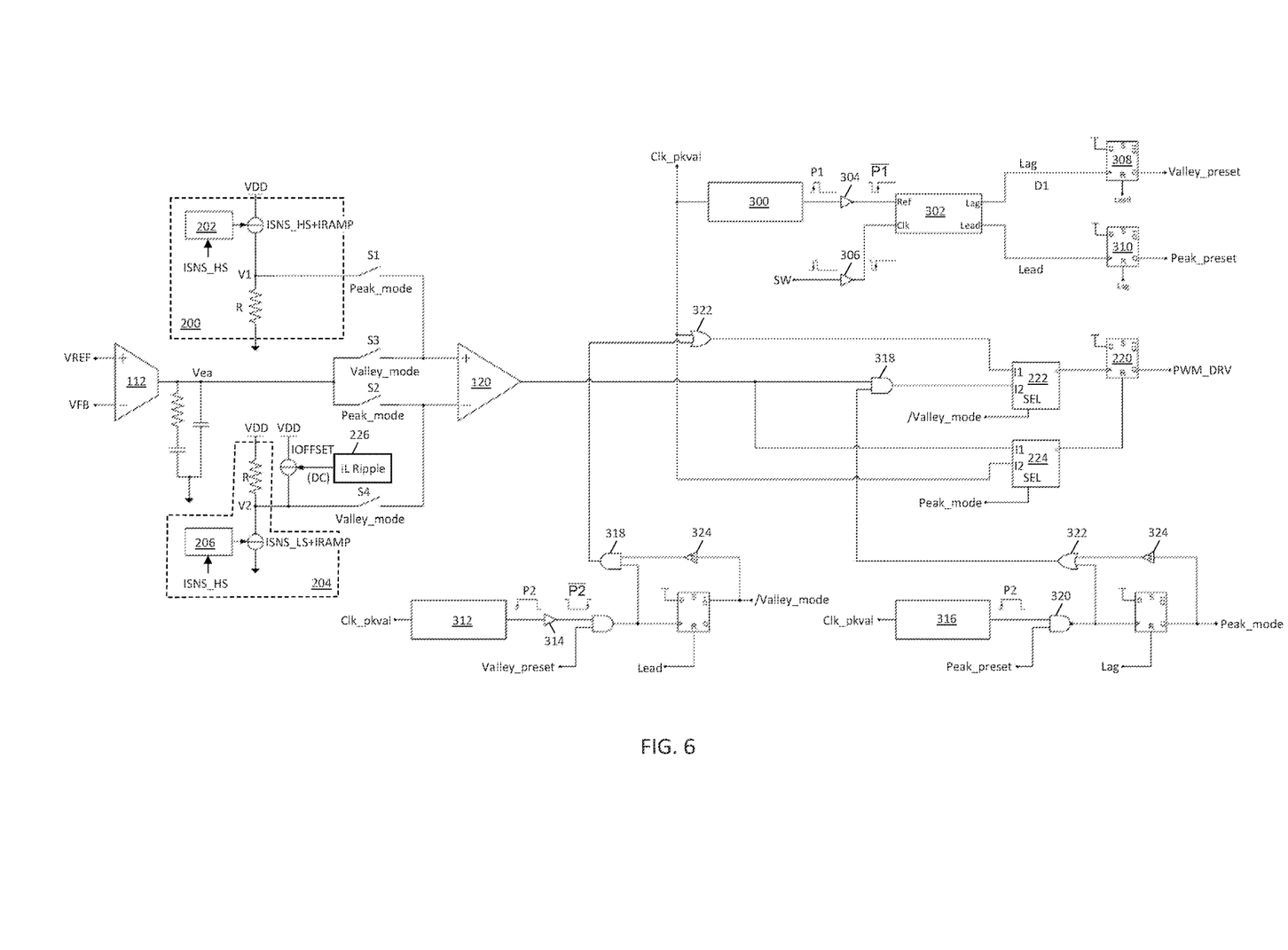
FIG. 6 illustrates a circuit schematic of the controller circuitry that configures the comparator in either the peak current control mode or the valley current control mode for each switching cycle of the power converter, according to another embodiment.
Figure 7:
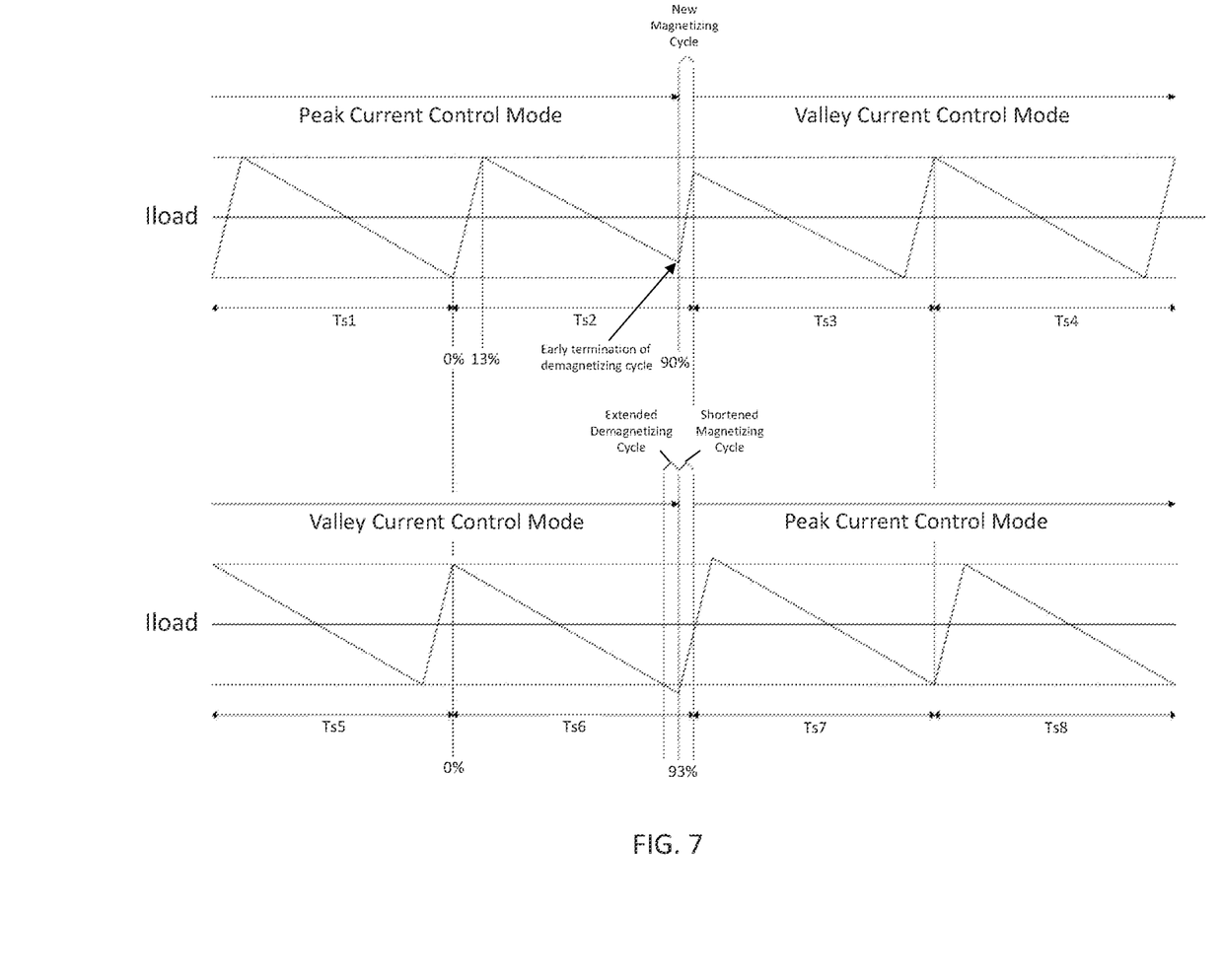
FIG. 7 illustrates a first waveform diagram of a transition from the peak current control mode to the valley current control mode and a second waveform diagram of a transition from the valley current control mode to the peak current control mode, as implemented by the controller embodiment illustrated in FIG. 6.

FIG. 6 illustrates an embodiment of the circuitry 122 that configures the comparator 120 in either the peak current control mode or the valley current control mode for each switching cycle of the power converter 102. According to this embodiment, the circuitry 122 includes the same switches S1-S4 and current measurement circuits 200, 204 as the embodiment in FIG. 4. The circuitry 122 also includes the same multiplexors 222, 224 and latch 220 that output the gate drive signal PWM_DRV for the high-side switch device Q1 of the power converter 102 as the embodiment in FIG. 4.

In FIG. 6, the circuitry 122 also includes a main pulse generator 300 and a phase detector 302. The main pulse generator 300 generates a first periodic pulse P1 synched to a system clock 'Clk_pkval' generated by the current mode controller 100 and having a constant width. Accordingly, the main pulse generator 300 may be considered as a constant on-time generator. An inverter 304 may invert the first periodic pulse P1 as a reference input 'Ref' to the phase detector 302.

The phase detector 302 determines whether a rising or falling edge of the voltage Vsw at the switch node SW of the power converter 102 lags or leads the same rising or falling edge of the first periodic pulse P1. An inverter 306 may invert the switch node voltage Vsw as the clock input 'Clk' of the phase detector 302.

A first latch 308 has a lagging indicator 'Lag' generated by the phase detector 302 as a clock input and a leading indicator 'Lead' generated by the phase detector 302 as a reset input 'R'. A second latch 310 has the leading indicator 'Lead' generated by the phase detector 302 as a clock input and the lagging indicator 'Lag' generated by the phase detector 302 as a reset input 'R'.

A valley mode pulse generator 312 generates a second periodic pulse P2 synched to the system clock Clk_pkval and having a constant width. Accordingly, the valley mode pulse generator 312 may be considered as a constant on-time generator. An inverter 314 may invert the second periodic pulse P2.

A peak mode pulse generator 316 generates a third periodic pulse P3 synched to the system clock Clk_pkval and having a constant width. Accordingly, the peak mode pulse generator 316 may be considered as a constant on-time generator.

Combinatorial logic such as AND gates 318, NAND gates 320, OR gates 322, delay blocks 324, etc. collectively control the transition events when going from the peak current control mode to the valley current control mode or from the valley current control mode to the peak current control mode, based on the second periodic pulse P2, the third periodic pulse P3, the leading indicator 'Lead' generated by the phase detector 302, the lagging indicator 'Lag' generated by the phase detector 302, an output 'Valley_preset' of the first latch 308, and an output 'Peak_preset' of the second latch 310. In one embodiment, the constant width of the first periodic pulse P1 determines the transition point.

As shown in the upper graph FIG. 7, when transitioning from the peak current control mode to the valley current control mode, the combinatorial logic of the controller circuitry 122 terminates early a demagnetizing cycle of switching period Ts2 in the peak current control mode and initiates a new magnetizing cycle during the part of the switching period Ts2 in which the demagnetizing cycle was terminated early. The high-side switch device Q1 of the power converter 102 is off and the low-side switch device Q2 of the power converter 102 is on during a demagnetizing cycle, and the high-side switch device Q1 is on and the low-side switch device Q2 is off during a magnetizing cycle. Accordingly, the inductor current iL decreases during a demagnetizing cycle and increases during a magnetizing cycle.

In the example shown in FIG. 7, the newly added magnetizing cycle extends over the last 10% of switching cycle Ts2 which avoids a bump in the average inductor current. If instead the demagnetizing cycle of switching period Ts2 was not terminated early, a drop in the average inductor current would occur. In one embodiment, the constant width of the second periodic pulse P2 determines how early the demagnetizing cycle of the switching period Ts2 in the peak current control mode is terminated.

As shown in the lower graph FIG. 7, when transitioning from the valley current control mode to the peak current control mode, the combinatorial logic of the controller circuitry 122 extends the demagnetizing cycle of a switching period Ts6 in the valley current control mode such that a subsequent magnetizing cycle that begins at the end of the extended demagnetizing cycle is shortened. Otherwise, the subsequent magnetizing cycle would have started earlier and caused a bump in the average inductor current. In one embodiment, the constant width of the third periodic pulse P3 determines how long the demagnetizing cycle of the switching period Ts6 in the peak current control mode is extended.

Table 1 provides equations which calculate the location in the switching period Ts that precedes the transition point where an extra magnetizing portion is injected at the end of the period, e.g., as shown in the top graph of FIG. 7, or where the demagnetizing portion of the period is extended. e.g., as shown in the bottom graph of FIG. 7.

TABLE 1

| Transition Point | Valley COT Duty Cycle | Peak COT duty Cycle |
|---|---|---|
| D | $D + \left(\frac{D'}{2}\right) + \frac{D'}{2*\left(1+\left(\frac{2D}{D'}\right)\right)}$ | $D' + \left(\frac{D*D'}{2}\right)$ |
| 13% | 90% | 93% |

The 'location is expressed as a duty cycle in Table 1. When the transition duty cycle 'D' is small, then the location is about the same for going peak-to-valley or valley-to-peak. The constant width of the second periodic pulse P2 may be greater than the constant width of the first periodic pulse P1. The same periodic pulse 'COT' may be used for the valley and peak mode pulse generators 312, 316 or a slightly greater periodic pulse may be used for one pulse generator 312/316 compared to the other pulse generator 316/312. Accordingly, the pulses P2, P3 generated by the valley and peak mode pulse generators 312, 316 may have the same constant width or different constant widths. The transition point is determined by comparing the first periodic pulse P1 with the voltage Vsw at the switch node SW of the power converter 102. The 13% transition point, 90% duty cycle for the valley mode pulse generator 312, and 93% duty cycle for the peak mode pulse generator 316 are merely given as examples and should not be considered limiting in any way.

Injecting magnetizing and demagnetizing cycles as shown in FIG. 7 ensures the average inductor current remains unchanged across current mode transitions. The duty cycle of the main pulse generator 300 determines where the transition point occurs. The duty cycle of the valley mode pulse generator 312 determines the injection point for a magnetizing cycle for a peak-to-valley current mode transition, e.g., as shown in the upper graph in FIG. 7. The duty cycle of the peak mode pulse generator 316 adds a demagnetizing cycle and determines the (delayed) injection point for the subsequent magnetizing cycle for a valley-to-peak current mode transition, e.g., as shown in the lower graph in FIG. 7. The valley and peak mode pulse generators 312, 316 are set based on the main pulse generator 300 and the respective duty cycles are calculated to cancel disturbances on the average inductor current. That is, the constant width of the second periodic pulse P2 and the constant width of the third periodic pulse P3 may be determined based on the constant width of the first periodic pulse P1 and chosen to cancel disturbances on the average inductor current of the power converter 102. The pulse generators 300, 312, 316 may be programmable but loosely track each other since accurate tracking is not required.

The controller embodiment shown in FIG. 6 does not require emulation or sensing of the power converter output voltage Vout. The magnetizing and demagnetizing cycles do not need to be precise to prevent disturbances on Vout, since the error amplifier 112 tends to be slow moving with respect to current sense signals. Also, the output capacitor Cout of the power converter 102 absorbs small variations on the inductor peaks and valleys. The pulse generators 300, 312, 316 may be designed as fractions of a high-speed clock, e.g., 22 MHz for 10% resolution at a switching frequency of 2.2 MHz or 44 MHz for 5% resolution the same switching frequency.

The embodiments illustrated in FIGS. 4 and 6 both make use of the same multiplexed peak and valley PWM (pulse width modulation) modulator. The PWM modulator is driven by the timing signals generated by the corresponding transition controller as described for each embodiment. Both embodiments use a single system clock as a reference to achieve the corresponding current mode transition functionality.

Although the present disclosure is not so limited, the following numbered examples demonstrate one or more aspects of the disclosure.

Example 1. A current mode controller, comprising: an error amplifier configured to generate an error signal that corresponds to the difference between a reference voltage and a voltage indicative of an output voltage of a power converter; a first current measurement circuit configured to measure current flowing in a high-side switch device of the power converter; a second current measurement circuit configured to measure current flowing in a low-side switch device of the power converter; a comparator configured to indicate when a voltage derived by the first current measurement circuit exceeds the error signal in a peak current control mode, and when a voltage derived by the second current measurement circuit drops below the error signal in a valley current control mode; and circuitry configured to configure the comparator in either the peak current control mode or the valley current control mode for each switching cycle of the power converter.

Example 2. The current mode controller of example 1, wherein the circuitry comprises: a first switch configured to connect the voltage derived by the first current measurement circuit to a positive input of the comparator in the peak current control mode and a second switch configured to connect the error signal to a negative input of the comparator in the peak current control mode; and a third switch configured to connect the error signal to the positive input of the comparator in the valley current control mode and a fourth switch configured to connect the voltage derived by the second current measurement circuit to the negative input of the comparator in the valley current control mode.

Example 3. The current mode controller of example 1 or 2, wherein the circuitry comprises: a first pulse generator configured to generate a first periodic pulse synched to a system clock generated by the current mode controller and having a predetermined width; a second pulse generator configured to generate a second periodic pulse synched to the system clock and having a variable width that corresponds to a duty cycle of the power converter; and a phase detector configured to determine whether a rising or falling edge of the second periodic pulse lags or leads the corresponding rising or falling edge of the first periodic pulse.

Example 4. The current mode controller of example 3, wherein the second pulse generator is configured to determine the variable width of the second periodic pulse based on a difference between and an input voltage of the power converter and the voltage indicative of the output voltage of the power converter.

Example 5. The current mode controller of example 3, wherein the second pulse generator is configured to determine the variable width of the second periodic pulse based on an input voltage of the power converter and a voltage at a switch node between the high-side switch device and the low-side switch device of the power converter.

Example 6. The current mode controller of any of examples 3 through 5, wherein the circuitry comprises: a latch configured to indicate the peak current control mode if the phase detector indicates the rising or falling edge of the second periodic pulse lags the same rising or falling edge of the first periodic pulse, or indicate the valley current control mode if the phase detector indicates the rising or falling edge of the second periodic pulse leads the same rising or falling edge of the first periodic pulse.

Example 7. The current mode controller of any of examples 3 through 5, wherein the circuitry comprises: a latch configured to output a gate drive signal for the high-side switch device of the power converter; a first multiplexor configured, in the peak current control mode, to clock the latch based on the system clock and reset the latch based on an output of the comparator; and a second multiplexor configured, in the valley current control mode, to clock the latch based on the output of the comparator and reset the latch based on the second periodic pulse.

Example 8. The current mode controller of any of examples 3 through 5, wherein the circuitry comprises: a latch configured to output a gate drive signal for the high-side switch device of the power converter; a first multiplexor having the system clock as a first input, an output of the comparator as a second input, a select line controlled by the peak current control mode, and an output that forms a clock input of the latch; and a second multiplexor having the output of the comparator as a first input, the second periodic pulse as a second input, a select line determined by the valley current control mode, and an output that forms a reset input of the latch.

Example 9. The current mode controller of any of examples 1 through 8, wherein the circuitry comprises: a voltage offset circuit configured to inject a voltage offset into the voltage derived by the first current measurement circuit and/or the second current measurement circuit, wherein the voltage offset corresponds to output current ripple of the power converter.

Example 10. The current mode controller of any of examples 1 through 9, wherein the circuitry comprises: a first pulse generator configured to generate a first periodic pulse synched to a system clock generated by the current mode controller and having a constant width; and a phase detector configured to determine whether a rising or falling edge of the voltage at the switch node lags or leads the same rising or falling edge of the first periodic pulse.

Example 11. The current mode controller of example 10, wherein the circuitry comprises: a first latch having a lagging indicator generated by the phase detector as a clock input and a leading indicator generated by the phase detector as a reset input; and a second latch having the leading indicator generated by the phase detector as a clock input and the lagging indicator generated by the phase detector as a reset input.

Example 12. The current mode controller of example 11, wherein the circuitry comprises: a second pulse generator configured to generate a second periodic pulse synched to the system clock and having a constant width; a third pulse generator configured to generate a third periodic pulse synched to the system clock and having a constant width; and combinatorial logic configured to determine a transition point from the peak current control mode to the valley current control mode or from the valley current control mode to the peak current control mode, based on the second periodic pulse, the third periodic pulse, the leading indicator generated by the phase detector, the lagging indicator generated by the phase detector, an output of the first latch, and an output of the second latch.

Example 13. The current mode controller of example 12, wherein the constant width of the first periodic pulse determines the transition point.

Example 14. The current mode controller of example 12, wherein when transitioning from the peak current control mode to the valley current control mode, the combinatorial logic is configured to terminate early a demagnetizing cycle of a switching period in the peak current control mode and initiate a new magnetizing cycle during the part of the switching period in which the demagnetizing cycle was terminated early.

Example 15. The current mode controller of example 14, wherein the constant width of the second periodic pulse determines how early the demagnetizing cycle of the switching period in the peak current control mode is terminated.

Example 16. The current mode controller of any of examples 12 through 15, wherein when transitioning from the valley current control mode to the peak current control mode, the combinatorial logic is configured to extend a demagnetizing cycle of a switching period in the valley current control mode such that a subsequent magnetizing cycle that begins at the end of the extended demagnetizing cycle is shortened.

Example 17. The current mode controller of example 16, wherein the constant width of the third periodic pulse determines how long the demagnetizing cycle of the switching period in the peak current control mode is extended.

Example 18. The current mode controller of any of examples 12 through 17, wherein the constant width of the second periodic pulse is greater than the constant width of the first periodic pulse, and wherein the second periodic pulse and the third periodic pulse have the same constant width.

Example 19. The current mode controller of any of examples 12 through 18, wherein the constant width of the second periodic pulse and the constant width of the third periodic pulse are determined based on the constant width of the first periodic pulse and chosen to cancel disturbances on an average inductor current of the power converter.

Example 20. A method of operating a current mode controller, the method comprising: generating an error signal that corresponds to the difference between a reference voltage and a voltage indicative of an output voltage of a power converter; measuring, via a first current measurement circuit, current flowing in a high-side switch device of the power converter; measuring, via a second current measurement circuit, current flowing in a low-side switch device of the power converter; indicating, via a comparator, when a voltage derived by the first current measurement circuit exceeds the error signal in a peak current control mode, and when a voltage derived by the second current measurement circuit drops below the error signal in a valley current control mode; and configuring the comparator in either the peak current control mode or the valley current control mode for each switching cycle of the power converter.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A current mode controller, comprising:
an error amplifier configured to generate an error signal that corresponds to the difference between a reference voltage and a voltage indicative of an output voltage of a power converter;
a first current measurement circuit configured to measure current flowing in a high-side switch device of the power converter;
a second current measurement circuit configured to measure current flowing in a low-side switch device of the power converter;
a comparator configured to indicate when a voltage derived by the first current measurement circuit exceeds the error signal in a peak current control mode, and when a voltage derived by the second current measurement circuit drops below the error signal in a valley current control mode; and
circuitry configured to configure the comparator in either the peak current control mode or the valley current control mode for each switching cycle of the power converter.

2. The current mode controller of claim 1, wherein the circuitry comprises:
a first switch configured to connect the voltage derived by the first current measurement circuit to a positive input of the comparator in the peak current control mode and a second switch configured to connect the error signal to a negative input of the comparator in the peak current control mode; and
a third switch configured to connect the error signal to the positive input of the comparator in the valley current control mode and a fourth switch configured to connect the voltage derived by the second current measurement circuit to the negative input of the comparator in the valley current control mode.

3. The current mode controller of claim 1, wherein the circuitry comprises:
a first pulse generator configured to generate a first periodic pulse synched to a system clock generated by the current mode controller and having a predetermined width;
a second pulse generator configured to generate a second periodic pulse synched to the system clock and having a variable width that corresponds to a duty cycle of the power converter; and
a phase detector configured to determine whether a rising or falling edge of the second periodic pulse lags or leads the corresponding rising or falling edge of the first periodic pulse.

4. The current mode controller of claim 3, wherein the second pulse generator is configured to determine the variable width of the second periodic pulse based on a difference between and an input voltage of the power converter and the voltage indicative of the output voltage of the power converter.

5. The current mode controller of claim 3, wherein the second pulse generator is configured to determine the variable width of the second periodic pulse based on an input voltage of the power converter and a voltage at a switch node between the high-side switch device and the low-side switch device of the power converter.

6. The current mode controller of claim 3, wherein the circuitry comprises:
a latch configured to indicate the peak current control mode if the phase detector indicates the rising or falling edge of the second periodic pulse lags the same rising or falling edge of the first periodic pulse, or indicate the valley current control mode if the phase detector indicates the rising or falling edge of the second periodic pulse leads the same rising or falling edge of the first periodic pulse.

7. The current mode controller of claim 3, wherein the circuitry comprises:
a latch configured to output a gate drive signal for the high-side switch device of the power converter;
a first multiplexor configured, in the peak current control mode, to clock the latch based on the system clock and reset the latch based on an output of the comparator; and
a second multiplexor configured, in the valley current control mode, to clock the latch based on the output of the comparator and reset the latch based on the second periodic pulse.

8. The current mode controller of claim 3, wherein the circuitry comprises:
a latch configured to output a gate drive signal for the high-side switch device of the power converter;
a first multiplexor having the system clock as a first input, an output of the comparator as a second input, a select line controlled by the peak current control mode, and an output that forms a clock input of the latch; and
a second multiplexor having the output of the comparator as a first input, the second periodic pulse as a second input, a select line determined by the valley current control mode, and an output that forms a reset input of the latch.

9. The current mode controller of claim 1, wherein the circuitry comprises:
a voltage offset circuit configured to inject a voltage offset into the voltage derived by the first current measurement circuit and/or the second current measurement circuit, wherein the voltage offset corresponds to output current ripple of the power converter.

10. The current mode controller of claim 1, wherein the circuitry comprises:
a first pulse generator configured to generate a first periodic pulse synched to a system clock generated by the current mode controller and having a constant width; and
a phase detector configured to determine whether a rising or falling edge of the voltage at the switch node lags or leads the same rising or falling edge of the first periodic pulse.

11. The current mode controller of claim 10, wherein the circuitry comprises:
a first latch having a lagging indicator generated by the phase detector as a clock input and a leading indicator generated by the phase detector as a reset input; and
a second latch having the leading indicator generated by the phase detector as a clock input and the lagging indicator generated by the phase detector as a reset input.

12. The current mode controller of claim 11, wherein the circuitry comprises:

a second pulse generator configured to generate a second periodic pulse synched to the system clock and having a constant width;

a third pulse generator configured to generate a third periodic pulse synched to the system clock and having a constant width; and combinatorial logic configured to determine a transition point from the peak current control mode to the valley current control mode or from the valley current control mode to the peak current control mode, based on the second periodic pulse, the third periodic pulse, the leading indicator generated by the phase detector, the lagging indicator generated by the phase detector, an output of the first latch, and an output of the second latch.

13. The current mode controller of claim 12, wherein the constant width of the first periodic pulse determines the transition point.

14. The current mode controller of claim 12, wherein when transitioning from the peak current control mode to the valley current control mode, the combinatorial logic is configured to terminate early a demagnetizing cycle of a switching period in the peak current control mode and initiate a new magnetizing cycle during the part of the switching period in which the demagnetizing cycle was terminated early.

15. The current mode controller of claim 14, wherein the constant width of the second periodic pulse determines how early the demagnetizing cycle of the switching period in the peak current control mode is terminated.

16. The current mode controller of claim 12, wherein when transitioning from the valley current control mode to the peak current control mode, the combinatorial logic is configured to extend a demagnetizing cycle of a switching period in the valley current control mode such that a subsequent magnetizing cycle that begins at the end of the extended demagnetizing cycle is shortened.

17. The current mode controller of claim 16, wherein the constant width of the third periodic pulse determines how long the demagnetizing cycle of the switching period in the peak current control mode is extended.

18. The current mode controller of claim 12, wherein the constant width of the second periodic pulse is greater than the constant width of the first periodic pulse, and wherein the second periodic pulse and the third periodic pulse have the same constant width.

19. The current mode controller of claim 12, wherein the constant width of the second periodic pulse and the constant width of the third periodic pulse are determined based on the constant width of the first periodic pulse and chosen to cancel disturbances on an average inductor current of the power converter.

20. A method of operating a current mode controller, the method comprising:

generating an error signal that corresponds to the difference between a reference voltage and a voltage indicative of an output voltage of a power converter;

measuring, via a first current measurement circuit, current flowing in a high-side switch device of the power converter;

measuring, via a second current measurement circuit, current flowing in a low-side switch device of the power converter;

indicating, via a comparator, when a voltage derived by the first current measurement circuit exceeds the error signal in a peak current control mode, and when a voltage derived by the second current measurement circuit drops below the error signal in a valley current control mode; and configuring the comparator in either the peak current control mode or the valley current control mode for each switching cycle of the power converter.

* * * * *